178X
T. Bruff, Sr.
Tooth Extractor.
Patented June 28, 1797.
NO PRINTED SPECIFICATION AVAILABLE
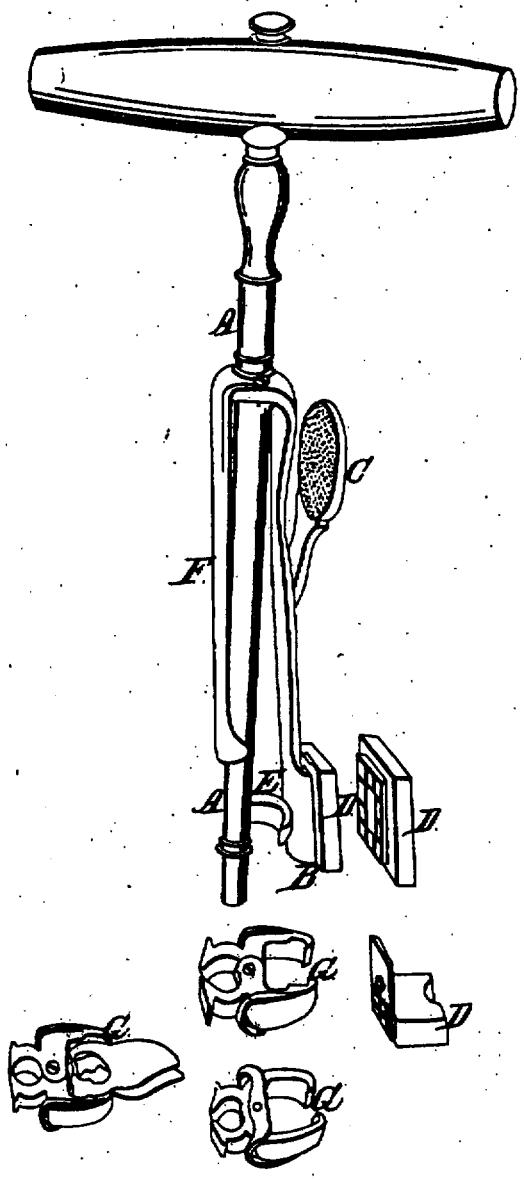

8X

Thomas Bruff Senr

Letters Patent, Dated June 28. 1797.

The Schedule referred to in these Letters Patent and making part of the same containing a description in the words of the said Thomas Bruff Senior himself of his an improvement in extracting te Specification. This instrument has a double claw with a joint near the middle, and a spring to draw them together when set on the tooth. It has a fulcrum with two branches, one to answer as a handle for the left hand to keep it on the adjacent teeth, the other having a hook on the upper part of the end answering as a guide and support to the lever which [illegible] passes through the staple at the extreme end, and the point through the eye of the claw — under the fulcrum is a crooked cap (sliding on with a screw head and turning on a pin) made to shift to suit the side and shape of the jaw. There is another cap made long design ed to rest on the front and back teeth, equally having a hole through the middle large enough to draw the claw through. The lever has a handle only like the common key Instrument. It has a crooked blade near the extreme end to raise it perpendicular from the fulcrum, when turned by the handle; it passes through the hook of the fulcrum to the shoulder, which is about two inches from the handle, the point being small and round passes through the eye of the claw (which is sharp at the top), and by a turn on the back of the blade brings out the tooth in a perpendicular direction Witnesses present at signing }
J. Gardette
B.de Oenaf Thos Bruff Senr.

(Signed)

(Patented 28 June 1797)
([illegible])